United States Patent
Koller et al.

(10) Patent No.: US 11,879,581 B2
(45) Date of Patent: Jan. 23, 2024

(54) UNISEX BALL VALVE COUPLING WITH SAFETY LOCKING MECHANISM

(71) Applicant: Parker-Hannifin Corporation, Cleveland, OH (US)

(72) Inventors: Jason Koller, Eden Prairie, MN (US); Paul E. Lemay, Cleveland, OH (US); Shawn D. Ellis, College Place, WA (US); Timothy Marquis, Otsego, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 61 days.

(21) Appl. No.: 17/792,854

(22) PCT Filed: Mar. 19, 2021

(86) PCT No.: PCT/US2021/023117
§ 371 (c)(1),
(2) Date: Jul. 14, 2022

(87) PCT Pub. No.: WO2021/202125
PCT Pub. Date: Oct. 7, 2021

(65) Prior Publication Data
US 2023/0021378 A1   Jan. 26, 2023

Related U.S. Application Data

(60) Provisional application No. 63/084,691, filed on Sep. 29, 2020, provisional application No. 63/002,656, filed on Mar. 31, 2020.

(51) Int. Cl.
*F16L 37/373* (2006.01)
*F16L 37/36* (2006.01)

(52) U.S. Cl.
CPC .............. *F16L 37/373* (2013.01); *F16L 37/36* (2013.01); *F16L 2201/10* (2013.01); *F16L 2201/20* (2013.01)

(58) Field of Classification Search
CPC ......... F16L 37/36; F16L 37/373; F16L 37/44; F16L 37/47; F16L 2201/10; F16L 29/002
See application file for complete search history.

(56) References Cited

U.S. PATENT DOCUMENTS

| 4,438,779 | A | * | 3/1984 | Allread | ................. | F16L 37/113 |
| | | | | | | 285/85 |
| 5,099,883 | A | * | 3/1992 | Maiville | ............... | F16L 37/373 |
| | | | | | | 285/87 |

(Continued)

OTHER PUBLICATIONS

International Search Report and Written Opinion of the International Searching Authority for corresponding International Patent Application No. PCT/US2021/023117, dated Jun. 24, 2021.

*Primary Examiner* — David Colon-Morales
(74) *Attorney, Agent, or Firm* — Renner, Otto, Boisselle & Sklar, LLP (57) ABSTRACT

A coupling assembly (10) is reconfigurable among three states. In a disconnected state, a spring-biased lock indicator (20) is in a first lock indicator position, and the lock indicator includes a restriction member (40) that in the first lock indicator position retains an actuator in a first actuator position such that a valve is in a closed position and a locking pin is in a retracted position. In a connected/valve-closed state, the lock indicator (20) is in a second lock indicator position in which the restriction member (40) permits movement of the actuator (30), but with the actuator (30) still being in the first actuator position such that the valve is in the closed position and the locking pin (46) is in the retracted position. In a connected/valve-open state, the lock indicator (20) is in the second lock indicator position to (Continued)

permit movement of the actuator (30), and now with the actuator (30) being in the second actuator position such that the valve is in the open position and the locking pin (46) is in an extended position to lock a second coupling assembly to the coupling assembly to form a unisex coupling connection.

16 Claims, 7 Drawing Sheets

(56) References Cited

U.S. PATENT DOCUMENTS

| | | | | |
|---|---|---|---|---|
| 5,332,001 A | * | 7/1994 | Brown | F16L 37/36 |
| | | | | 251/96 |
| 5,402,825 A | * | 4/1995 | McCracken | F16L 37/373 |
| | | | | 137/614.01 |
| 5,488,972 A | * | 2/1996 | McCracken | F16L 37/373 |
| | | | | 137/614.01 |
| 5,505,428 A | * | 4/1996 | De Moss | F16L 37/47 |
| | | | | 251/368 |
| 5,671,777 A | | 9/1997 | Allen et al. | |
| 8,132,781 B2 | * | 3/2012 | Haunhorst | F16L 37/373 |
| | | | | 251/149.9 |
| 8,662,108 B2 | * | 3/2014 | Haunhorst | F16L 37/0841 |
| | | | | 251/248 |
| 8,814,137 B2 | * | 8/2014 | Wong | F16L 37/18 |
| | | | | 251/149.9 |
| 8,857,790 B2 | * | 10/2014 | Wong | F16K 5/0647 |
| | | | | 251/111 |
| 8,887,762 B2 | * | 11/2014 | Densel | F16L 37/36 |
| | | | | 251/149.9 |
| 8,967,177 B2 | * | 3/2015 | Haunhorst | F16L 37/36 |
| | | | | 137/614.01 |
| 9,341,294 B2 | | 5/2016 | Wong | |
| 9,851,017 B2 | | 12/2017 | Wong | |

\* cited by examiner

UNISEX BALL VALVE COUPLING WITH SAFETY LOCKING MECHANISM

RELATED APPLICATIONS

This application is a national phase of International Application No. PCT/US2021/023117 filed Mar. 19, 2021, which claims the benefit of U.S. Provisional Application No. 63/002,656 filed Apr. 13, 2020, and of U.S. Provisional Application No. 63/084,691 filed Sep. 29, 2020, the contents of which are incorporated herein by reference.

FIELD OF INVENTION

The present disclosure relates generally to unisex fluid couplings for connecting components such as pipes, hoses, and the like in a fluid system, and in particular to fluid couplings including a valve and a safety locking mechanism for the control of fluid flow through the coupling.

BACKGROUND OF THE INVENTION

Fluid couplings that employ a control valve and a safety locking mechanism have a variety of applications that employ the passage of fluid between components of a fluid system. The control valve operates to prevent fluid flow when the coupling is disconnected, which prevents spilling from the disconnected fluid system components. Such couplings further employ a locking mechanism that can maintain the coupling in a connected state to permit fluid flow without the risk of the coupled fluid components becoming disconnected from the coupling. An actuator mechanism typically is operated by a user to move the valve position between the closed and open positions when the coupling is disconnected or connected, i.e., the actuator mechanism operates to open the valve when the coupling is in a fully connected state, and operates to close the valve when the coupling is disconnected. It is desirable, therefore, that the locking and actuator mechanisms of the fluid coupling have a simple construction that is easy to operate, while still providing effective locking and valve control.

SUMMARY OF THE INVENTION

Embodiments of the present application provide for an enhanced unisex coupling assembly configuration that includes a spring-loaded lock indicator with a sliding locking pin that interacts with a recess in another fluid system component. The locking indicator position controls movement of an actuator that actuates the locking pin to open the valve during a connection operation, and the locking pin prevents disconnection or uncoupling of the fluid system component while the valve is open with the coupling assembly in a connected state. The coupling assembly actuator employs a single leg to operate the sliding locking pin rather than a series of gear teeth as are commonly used in conventional configurations, thereby achieving a simplified construction while providing effective locking and valve control. The fluid system component may be a complementary second unisex coupling assembly, whereby the two unisex coupling assemblies lock together in the connected state with their respective valves open to form a unisex coupling connection.

The operation of the coupling assembly of the present application can be understood by reference to the following three different states of operation. In a first state of operation, the coupling assembly is in a disconnected state. In the first or disconnected state, the lock indicator is in a first lock indictor position, and the lock indicator includes a restriction member that restricts movement of the actuator to maintain the valve in the closed position. In exemplary embodiments, the restriction member is a shoulder that interacts against a stop ridge of the actuator to preclude movement of the actuator when the lock indicator is in the first lock indicator position.

During a connection operation, the lock indicator moves from the first lock indicator position to a second lock indicator position. As the lock indicator moves during the connection operation, the operation of the lock indicator effectively detects the connected state. The second lock indicator position corresponds to a second or connected state of the coupling assembly, but with the valve maintained in the closed position. In the second or connected/valve closed state of the coupling assembly, the lock indicator is located in said second lock indicator position, and in such position the restriction member is no longer positioned to restrict movement of the actuator to actuate the valve. In exemplary embodiments, the actuator includes an actuator groove, and in the second lock indicator position the shoulder of the lock indicator is aligned with the actuator groove of the actuator to permit the shoulder to slide within the actuator groove to permit movement of the actuator to actuate the valve. In this second state, however, the actuator is not yet moved or actuated, and thus the valve is still closed because the actuator is not yet actuated to open the valve.

Accordingly, the actuator is moveable between a first actuator position and a second actuator position to operate the valve. In the second state of the coupling assembly described above, the actuator is in the first actuator position which maintains the valve in the closed position. The actuator is then operable by a user to move the actuator from the first actuator position to a second actuator position, which opens the valve. In exemplary embodiments, the actuator may include a handle that is rotatable by a user to rotate the actuator from the first actuator position to the second actuator position to open the valve. As the handle is rotated to the second actuator position, the lock indicator shoulder slides within the actuator groove. The coupling assembly with the actuator in the second actuator position (valve open) constitutes a third or connected/valve open state of the coupling assembly. In such third state with the handle having been rotated to the second actuator position, the actuator opens the valve and further extends out a locking pin. In exemplary embodiments, the locking pin is extended out by a single leg located on the actuator, rather than employing a plurality of gear teeth as is commonly employed in conventional configurations. The extended locking pin extends into a locking recess in a cooperating or mating fluid system component, which prevents the cooperating and mating fluid system component from being rotated and disconnected from the coupling assembly.

Advantages of embodiments of the current application include the following. Embodiments of the current application employ only a single leg on the actuator to interact with the sliding locking pin. Conventional configurations have employed a plurality of gear teeth that interact with the sliding locking pin, which is a more complex configuration to manufacture and operate. In addition, embodiments of the current application employ a spring-loaded lock indicator with a restriction member feature to prevent or permit movement of the actuator depending upon the position of the lock indicator. Conventional configurations have employed a second locking pin for control of the handle or comparable actuator mechanism, which is a more complex configuration to manufacture and operate. Embodiments of the present application further may be employed in a unisex coupling arrangement in which a first coupling assembly interacts with an identical second coupling assembly. In such an arrangement, the locking pin of the first coupling assembly, when extended, extends into a hole or locking recess in the face of the mating second coupling assembly to provide an effective coupling while preventing leakage either during the connection operation or while in the disconnected state.

An aspect of the invention, therefore, is a fluid coupling assembly having an enhanced actuator and locking mechanism. In exemplary embodiments, the coupling assembly includes a coupler body having a first end and a second end opposite from the first end; a valve that is housed within the coupler body and is moveable between a closed position and an open position; a lock indicator that is movable along an outer surface of the coupler body between a first lock indicator position in which the lock indicator extends from the first end of the coupler body and a second lock indicator position that is retracted toward the second end of the coupler body relative to the first lock indicator position, wherein the lock indicator is biased toward the first lock indicator position and includes a restriction member; an actuator that is movable between a first actuator position and a second actuator position, wherein when the lock indicator is in the first lock indicator position the restriction member maintains the actuator in the first actuator position and precludes movement of the actuator to the second actuator position, and when the lock indicator is in the second lock indicator position the restriction member permits the actuator to move between the first actuator position and the second actuator position; and a locking pin that is moveable between a retracted position in which the locking pin is encompassed by the coupler body and an extended position in which the locking pin extends outward from the coupler body. The actuator moves the valve from the closed position to the open position when the actuator moves from the first actuator position to the second actuator position, and moves the valve from the open position to the closed position when the actuator moves from the second actuator position to the first actuator position. The actuator includes a leg that drives the locking pin from the retracted position to the extended position when the actuator moves from the first actuator position to the second actuator position, and drives the locking pin from the extended position to the retracted position when the actuator moves from the second actuator position to the first actuator position In this manner, the coupling assembly is reconfigurable among three states. The three states include a disconnected state in which the lock indicator is in the first lock indicator position, thereby maintaining the actuator in the first actuator position such that the valve is in the closed position and the locking pin is in the retracted position; a connected/valve closed state in which the lock indicator is in the second lock indicator position to permit movement of the actuator, with the actuator still being in the first actuator position such that the valve is in the closed position and the locking pin is in the retracted position; and a connected/valve open state in which the lock indicator is in the second lock indicator position to permit movement of the actuator, with the actuator being in the second actuator position such that the valve is in the open position and the locking pin is in the extended position.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present application will now be described with reference to the drawings, wherein like reference numerals are used to refer to like elements throughout. It will be understood that the figures are not necessarily to scale.

Embodiments of the present application provide for an enhanced unisex coupling assembly configuration that includes a spring-loaded lock indicator with a sliding locking pin that interacts with a locking recess in another fluid system component. The locking indicator position controls movement of an actuator that actuates the locking pin and opens the valve during a connection operation, and the locking pin prevents disconnection or uncoupling of the fluid system component while the valve is open with the coupling assembly in a connected state. The coupling assembly actuator employs a single leg to operate the sliding locking pin rather than a series of gear teeth as are commonly used in conventional configurations, thereby achieving a simplified construction while providing effective locking and valve control. The connecting fluid system component may be a complementary second unisex coupling assembly, whereby the two unisex coupling assemblies lock together in the connected state with their respective valves open to form a unisex coupling connection.

In general, a unisex coupling assembly according to embodiments of the present application is reconfigurable among three states. In a disconnected state, a spring-biased lock indicator is in a first lock indicator position, and the lock indicator includes a restriction member that in the first lock indicator position retains the actuator in a first actuator position such that a valve is in a closed position and the locking pin is in a retracted position. In a connected/valve-closed state, the lock indicator is in a second lock indicator position in which the restriction member permits movement of the actuator, but with the actuator still being in the first actuator position such that the valve is in the closed position and the locking pin is in the retracted position. In a connected/valve-open state, the lock indicator is in the second lock indicator position to permit movement of the actuator, and now with the actuator being in the second actuator position such that the valve is in the open position and the locking pin is in an extended position to lock a fluid system component to the coupling assembly.

Figure 1:
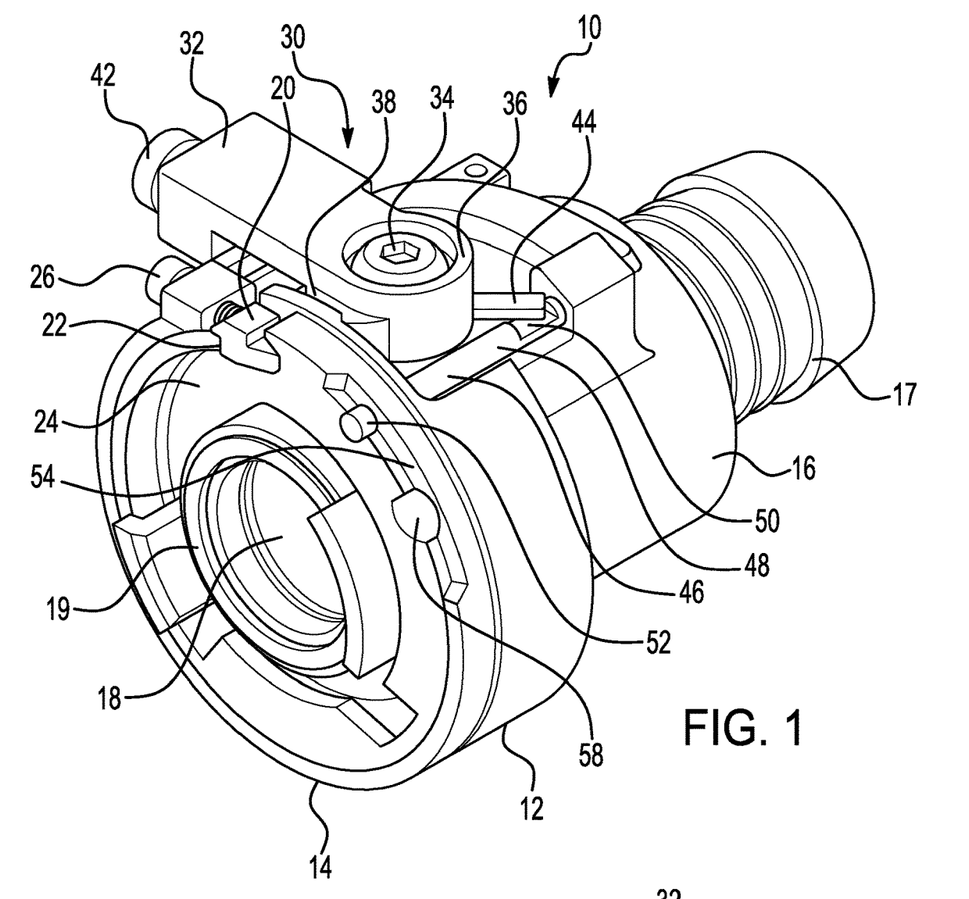
FIG. 1 is a drawing depicting a perspective view of an exemplary coupling assembly in accordance with embodiments of the present application.

FIG. 1 is a drawing depicting a perspective view of an exemplary coupling assembly 10 in accordance with embodiments of the present application. The coupling assembly 10 includes a coupler body 12 having a first end 14 and a second end 16 opposite from the first end that are connectable to opposing fluid system components. For example, the first end 14 may be configured for connection to a second coupling assembly, as further detailed below, to provide a unisex coupling arrangement. In this example, the second end 16 is illustrated as being fitted to a ribbed fluid connector 17 for connection to a hose or like component. It will be appreciated that other configurations of the connector end 17 may be employed for connection to any suitable fluid system component. The various components of the coupling assembly described below may be made of any rigid materials that are generally suitable for fluid couplings as are known in the art, such as for example metals or rigid plastic materials.

When in a fully connected state with the coupling assembly valve open, fluid can pass through the coupling assembly 10 between connected fluid system components. Accordingly, the coupler body 12 further encloses a valve 18 that is moveable between a valve closed position and a valve open position, wherein in the valve open position fluid can flow through the coupling assembly 10 between connected fluid system components. In exemplary embodiments, the valve 18 is configured as a ball valve that is rotatable between the open and closed positions. The coupling assembly further may include a seal element 19, such as an O-ring seal, that provides a seal when the coupling assembly 10 is connected to another fluid system component.

Figure 2:
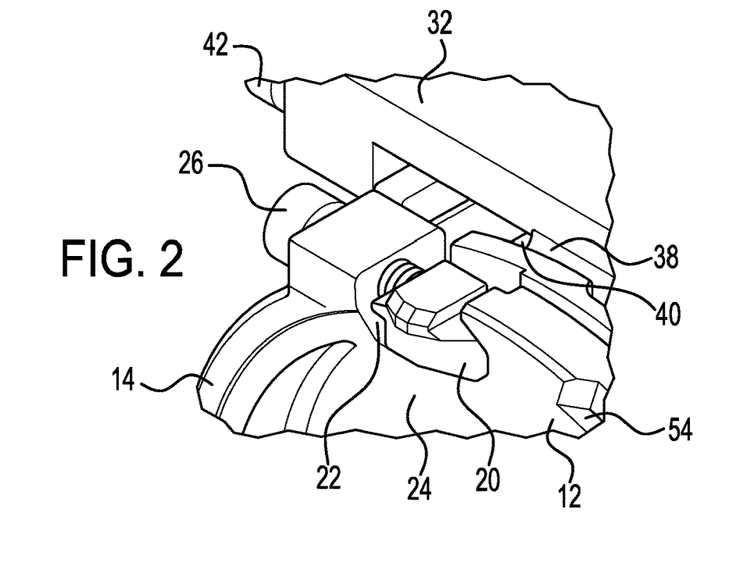
FIG. 2 and FIG. 3 are drawings depicting different close-up views of the lock indicator as positioned within the mating end of the coupling assembly of FIG. 1.
Figure 3:
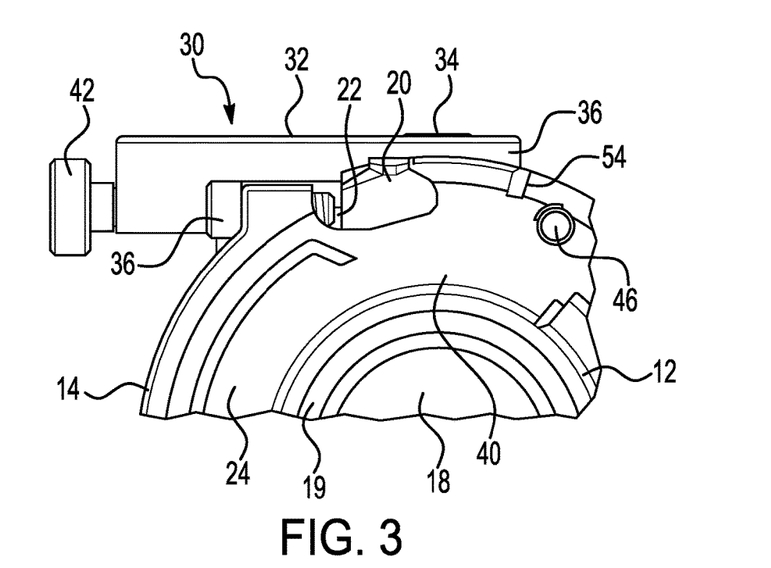

The coupling assembly 10 further includes a lock indicator 20 that is slidable along an outer surface of the coupler body 12 between a first lock indicator position and a second lock indicator position. In particular, the lock indicator 20 slides within an open slot 22 that is formed within the coupler body 12 adjacent to the first end 14 of the coupler body that forms a coupling face 24 of the coupler body 12. FIGS. 2 and 3 are drawings depicting different close-up viewpoints of the lock indicator 20 as positioned within the mating first end 14 of the coupling assembly 10 of FIG. 1. Such figures further illustrate the positioning of the lock indicator 20 within the open slot 22. As further detailed below, the lock indicator 20 is moveable between the first lock indicator position and the second lock indicator position in a direction that is perpendicular to the front face 24 at the first end 14 of the coupler body 12. The lock indicator 20 may be positioned adjacent to a fastening element 26, which fastens multiple components of the coupler body together and otherwise may aid in guiding the movement of the lock indicator in the desired perpendicular direction referenced above. The lock indicator 20 is biased toward the first lock indicator position by any suitable biasing member, such as for example a biasing spring 28 as described in more detail below and illustrated in subsequent figures (see, e.g., FIG. 4).

Figure 4:
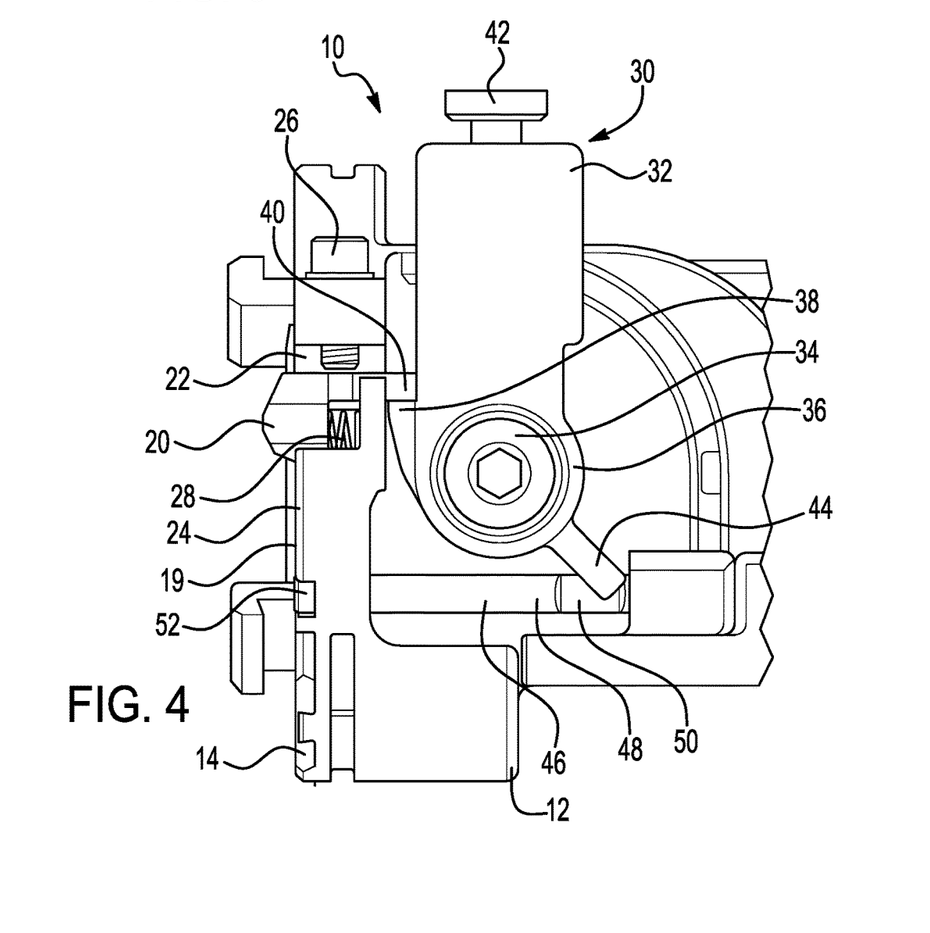
FIG. 4 is a drawing depicting a partial view of the lock indicator and actuator components of the coupling assembly of FIG. 1.

The coupling assembly 10 further includes an actuator 30 that is moveable by a user between a first actuator position and a second actuator position to operate the valve 18. To further illustrate the actuator, FIG. 4 is a drawing depicting a partial view of the lock indicator 20 and actuator components 30 of the coupling assembly 10 of FIG. 1. In exemplary embodiments, the actuator 30 may include a handle 32 that is operable by a user to rotate the actuator from the first actuator position to the second actuator position to open the valve. The actuator 30 includes a rotatable shaft 36 that is rotatable about a fastening element 34 that connects the actuator 30 to the valve 18. The fastening element 34 may be a bolt, screw, or comparable fastening element that can be rotated by operation of the actuator 30. The actuator shaft 36 extends into the coupler body 12 for driving the valve 18 between the closed position and the open position by interacting against the valve 18 as is conventional. In this manner, when the handle 32 is operated to rotate the actuator 30, such action is imparted to rotate the valve 18 between the open and closed positions. The actuator handle 32 further includes a stop ridge 38 that extends from the rotating shaft 36. The stop ridge 38 may be formed integrally with the rotating shaft 36. The stop ridge 38 is configured to interact with a restriction member 40 (see particularly FIGS. 2 and 4) located on the lock indicator 20, as further detailed below. In exemplary embodiments, the restriction member 40 is configured as a shoulder that interacts against the stop ridge 38 of the actuator to restrict movement of the actuator in the disconnected state of the coupling assembly. The actuator 30 further includes a pull button 42 that further is employed to unlock movement of the actuator 30 for connecting the coupling assembly.

The actuator 30 further includes a protrusion or leg 44 that extends radially from the rotating shaft 36, which also may be formed integrally with the rotating shaft 36. The leg 44 interacts with a locking pin 46 that is operable to lock the coupling assembly in a connected state when the valve is open. The locking pin 46 includes a base 48 that defines a pin recess 50. As further detailed below, the protrusion or leg 44 engages with the locking pin recess 50 to move the locking pin 46 between a retracted pin position and an extended pin position. The locking pin 46 further includes a locking end 52 that locks the coupling assembly to a mating fluid system component when the coupling assembly is in a connected state and the valve is open.

Figure 5A:
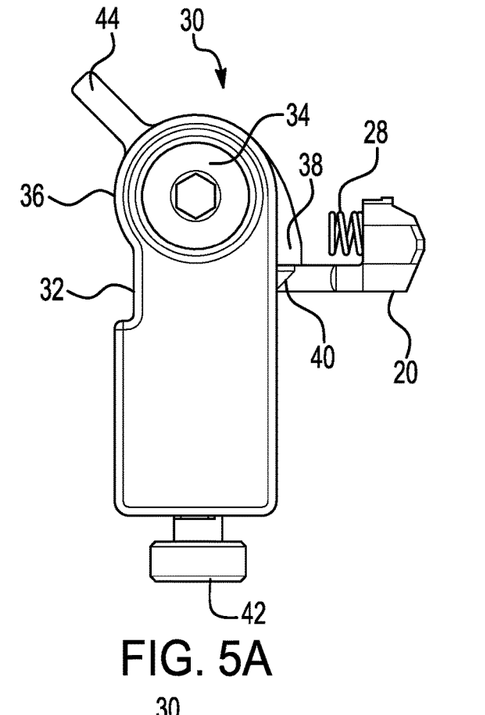
FIG. 5A and FIG. 5B are respective top and bottom views of the lock indicator and actuator components in isolation, which corresponds to the coupling assembly being in a disconnected state and with the valve closed.
Figure 5B:
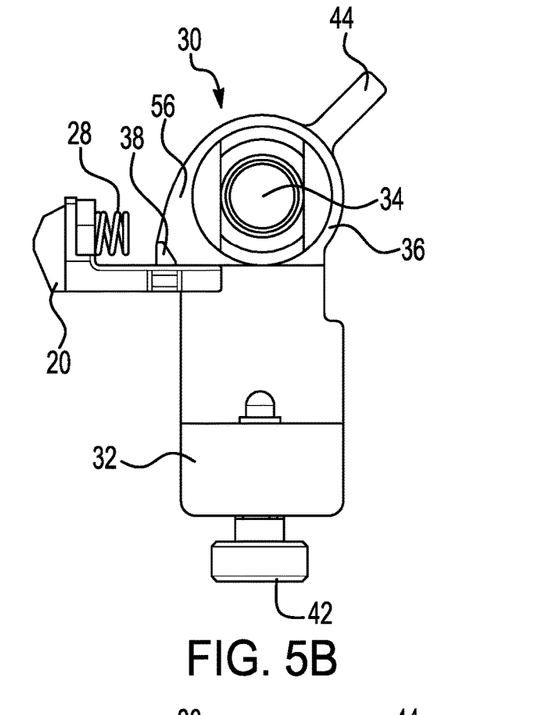
Figure 8:
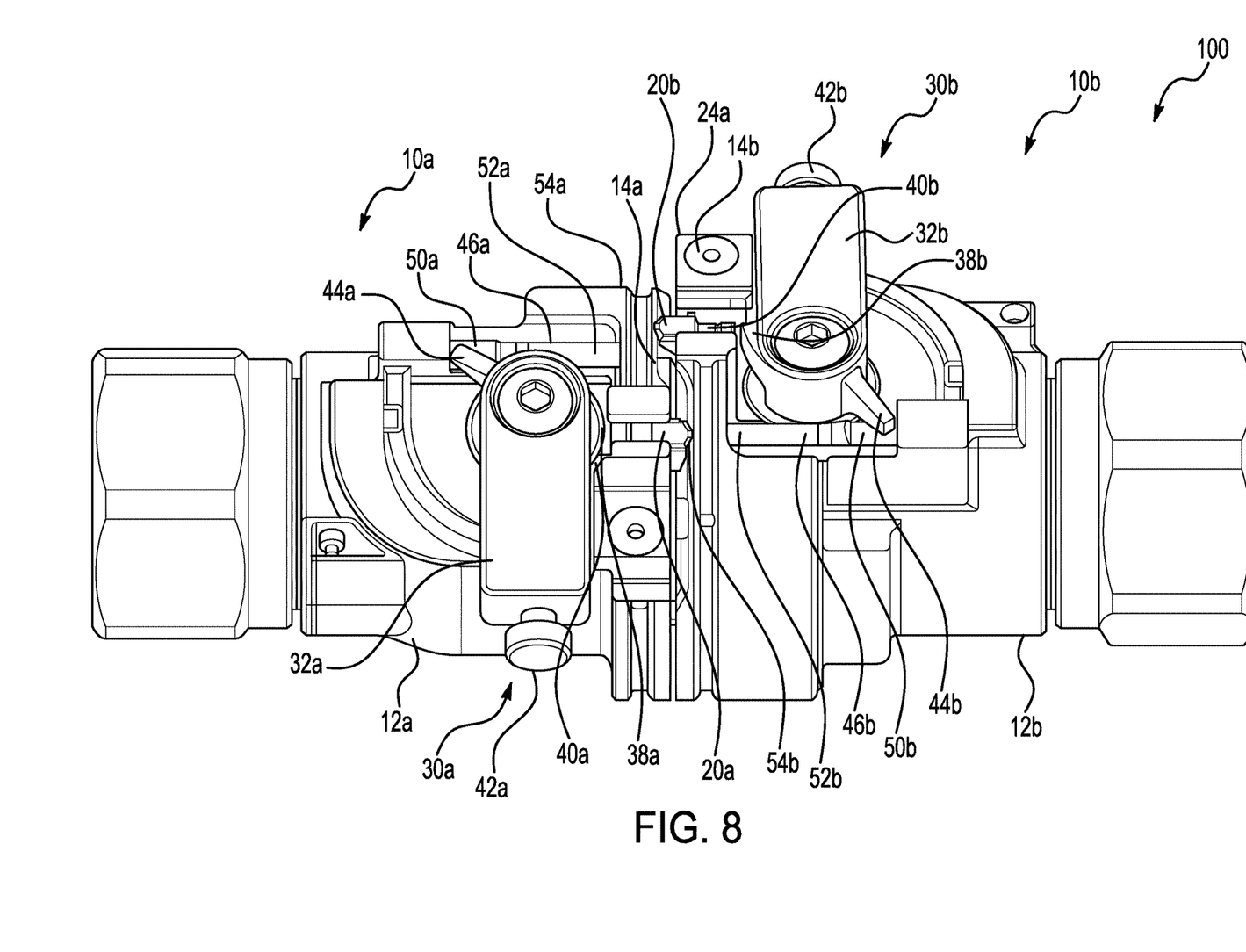
FIG. 8 is a drawing depicting an exemplary unisex coupling connection including two coupling assemblies, in which the coupling assemblies are aligned together but in a disconnected state with the valves closed.

As referenced above, the operation of the coupling assembly 10 can be understood by reference to the three different states of operation among which the coupling assembly is reconfigurable. A first state of operation corresponds to the coupling assembly being in a disconnected state. FIG. 5A and FIG. 5B are respective top and bottom views of the lock indicator and actuator components in isolation, which corresponds to the coupling assembly being in the disconnected state and with the valve closed to prevent fluid flow through the coupling connection. FIG. 8 is a drawing depicting an exemplary unisex coupling connection 100 including two coupling assembly components 10a and 10b, in which the coupling assemblies 10a and 10b are aligned together but in the disconnected state with the valves closed. Generally, in FIG. 8 like components are denoted with like reference numerals, except being designated "a" or "b" to denote the corresponding coupling assembly 10a or 10b.

In the first or disconnected state of operation, the lock indicator 20 is biased in the first lock indicator position by the spring 28. As seen particularly in the coupling connection depiction of FIG. 8, in such state the first lock indicator position corresponds to the lock indictors 20a/20b being extended by their respective springs 28 outward from their respective front faces 24a/24b at the first end 14a/14b of the coupler body 12a/12b. The first lock indicator position with the lock indicator 20 extending from the front face 24 also is the lock indicator position depicted in FIG. 4. To accommodate the interactions of the lock indicators 20a and 20b on opposing coupling assemblies, each front face of coupling assemblies 10a and 10b includes the respective recess 54 (denoted 54a and 54b as to each coupling assembly) that receives the lock indicator from the opposing coupling assembly (see also the recess 54 identified in FIG. 1). Still referring to FIG. 8, the actuators 30a and 30b are in the first actuator position prior to rotation of the handles 32a/32b, and thus the valve in each of the coupling assemblies is closed to prevent fluid flow through the coupling connection. As a result, the locking pins 46a and 46b are in the retracted position. In the disconnected state, the protrusion or legs 44a/44b of the actuators 30a/30b are positioned within the respective pin recesses 50a/50b of the locking pins 46a/46b. In the disconnected state, the actuators 30a/30b are the first actuator position, and thus via the legs 44a/44b, maintain the locking pins 46a/46b in the retracted position as shown in which the locking pins are fully enclosed within their respective coupler bodies.

As best seen in FIGS. 5A and 5B, and most particularly the top view of FIG. 5A, in the first or disconnected state the shoulder or restriction member 40 of the lock indicator 20 is shown, and in this state the shoulder 40 of the lock indicator 20 interacts against the stop ridge 38 of the actuator handle 32. In this state, therefore, the shoulder 40 prevents rotation of the actuator handle 32 by blocking against the stop ridge 38, and the actuator 30 thus is locked by the restriction member/shoulder 40 in the first actuator position. Because the actuator 30 cannot be rotated in the disconnected state of FIG. 8, the valves in turn are maintained and locked in the closed position to preclude fluid flow through the coupling assemblies 10a and 10b while the coupling assemblies are in the disconnected state, which prevents leakage. The bottom view of FIG. 5B further illustrates that the actuator handle 32 includes an actuator groove 56, which in this first state is out of alignment with the shoulder 40 of the lock indicator 20.

Figure 6A:
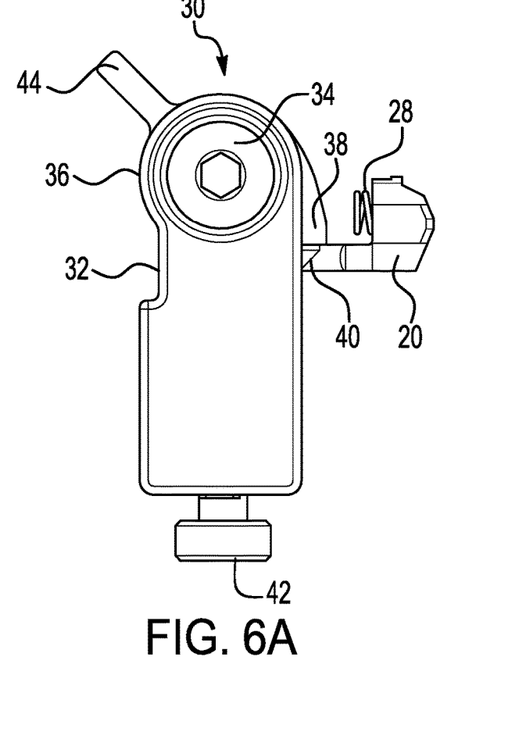
FIG. 6A and FIG. 6B are respective top and bottom views of the lock indicator and actuator components in isolation, which corresponds to the coupling assembly being in a connected state and with the valve still closed.
Figure 6B:
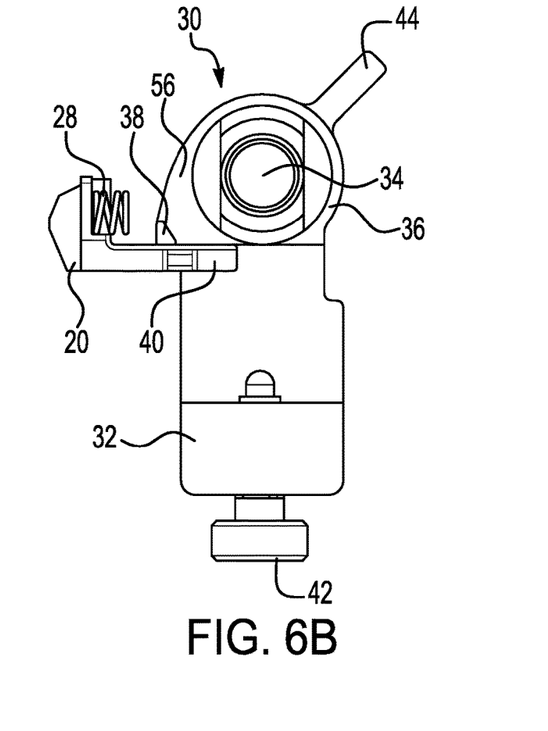
Figure 9:
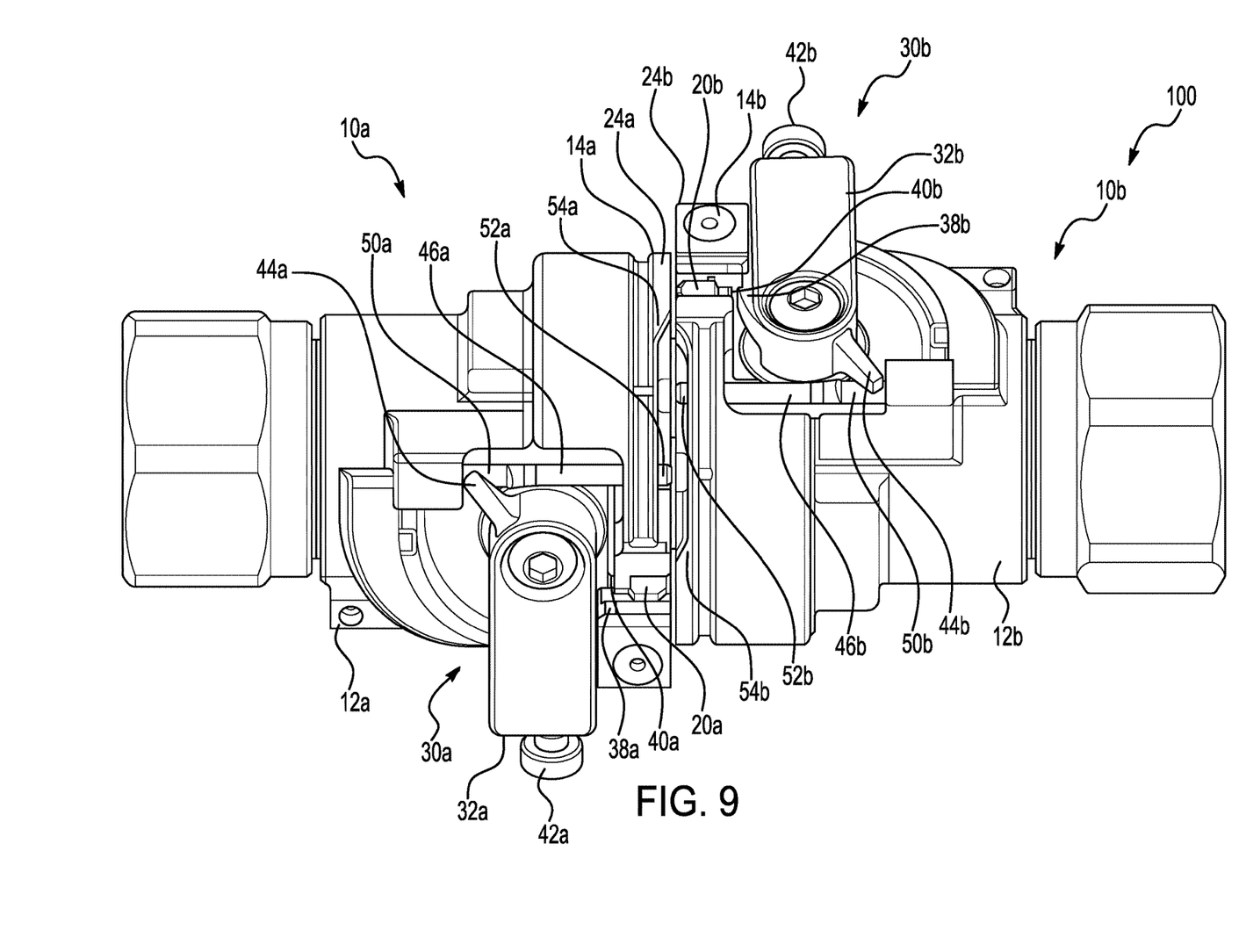
FIG. 9 is a drawing depicting the exemplary unisex coupling connection of FIG. 8, in which the coupling assemblies are in the connected state and with the valves still closed.

A second state of operation corresponds to the coupling assembly being in a connected state and with the valves still closed, i.e., a connected/valve closed state. FIG. 6A and FIG. 6B are respective top and bottom views of the lock indicator and actuator components in isolation, which corresponds to the coupling assembly being in the connected state and with the valves still closed to prevent fluid flow through the coupling connection. FIG. 9 is a drawing depicting the exemplary unisex coupling connection 100 including the two coupling assembly components 10a and 10b, in which the coupling assemblies 10a and 10b are in the disconnected state with the valves still closed. Again, in FIG. 9 like components are denoted with like reference numerals, except being designated "a" or "b" to denote the corresponding coupling assembly 10a or 10b.

As referenced above, to accommodate the interactions of the lock indicators 20a and 20b on opposing coupling assemblies, as shown in FIG. 9 each front face 24a/24b of coupling assemblies 10a and 10b includes the respective recess 54 (more specifically 54a and 54b as to each coupling assembly) that receives the lock indicator from the opposing coupling assembly when the coupling assemblies are in the disconnected state. To perform a connection operation to reconfigure the coupling assemblies 10a and 10b from the first state to the second and connected state, the coupling assemblies are rotated relative to one other in opposite directions. For example, coupling assembly 10a may be rotated while coupling assembly 10b remains stationary, coupling assembly 10b may be rotated while coupling assembly 10a remains stationary, or coupling assemblies 10a and 10b may be rotated in opposite directions. Because of the relative rotation, the recesses 54a and 54b operate as driving surfaces to the opposing lock indicators 20b and 20a from the first indicator position to the second indicator position. As each lock indicator 20a/20b moves from the first lock indicator position to the second lock indicator position during the connection operation, the interaction of the lock indicator restriction member effectively detects the connected state. This movement of the lock indicators 20a/20b, however, does not operate move the ball valves 18, and thus the valves remain closed in this second state.

Accordingly, in the second state of operation in which each lock indicator 20 is in the second lock indicator position, the lock indicator 20 is depressed against the bias of the spring 28. This state of the second lock indicator position is illustrated in FIG. 9. In such state the second lock indicator position corresponds to the lock indictors 20a/20b being retracted against the bias of their respective springs 28 inward into their respective front faces 24 at the first end 14 toward the second end 16, so as to be essentially encompassed within the coupler body 12. As referenced above, the second state is referred to as a connected/valve closed state, insofar as the actuators 30a and 30b are not as yet actuated to open the valves. Referring back to FIGS. 6A and 6B in combination with the connected/valve closed state illustrated in FIG. 9, in the second state the actuator assemblies 30a and 30b remain in the first actuator position 9 (similarly as in the disconnected state of FIG. 8) prior to rotation of the actuator handles, and thus the valves in each of the coupling assemblies are closed to prevent fluid flow through the coupling connection. As a result, the locking pins 46a and 46b still are in the retracted position. In the connected/valve closed state, similarly as in the disconnected first state, the legs 44a/44b of the actuators 30a/30b are positioned within the respective pin recesses 50a/50b of the locking pins 46a/46b. In the connected/valve closed state, the actuators 30a/30b still are in the first actuator position, and thus via the legs 44a/44b, maintain the locking pins 46a/46b in the retracted position as shown in FIG. 9 in which the locking pins remain fully enclosed within their respective coupler bodies.

As best seen in FIGS. 6A and 6B, in the second or connected/valve closed state the shoulder or restriction member 40 of the lock indicator 20 is moved away from the stop ridge 38 of the actuator handle 32, and therefore the shoulder 40 no longer interacts against the stop ridge 38. Rather, the shoulder 40 is now aligned with the actuator groove 56 of the actuator handle 32, as depicted in the bottom view of FIG. 6B. In this state, therefore, the shoulder 40 no longer prevents rotation of the actuator handle 32 because the shoulder 40 is able to slide within the groove 56 as the actuator handle is rotated. In the connected/valve closed state, therefore, the actuator 30 is no longer locked by the restriction member/shoulder 40 in the first actuator position. However, in the connected/valve closed second state, the actuator 30 is not as yet actuated, i.e., the handle 32 has not as yet been rotated. Because the actuator 30 has not yet been rotated in the connected/valve closed state of FIGS. 6A and 6B, the valves in turn remain locked in the closed position to preclude fluid flow through the coupling assemblies 10a and 10b while the coupling assemblies are in the connected/valve closed state.

Figure 7A:
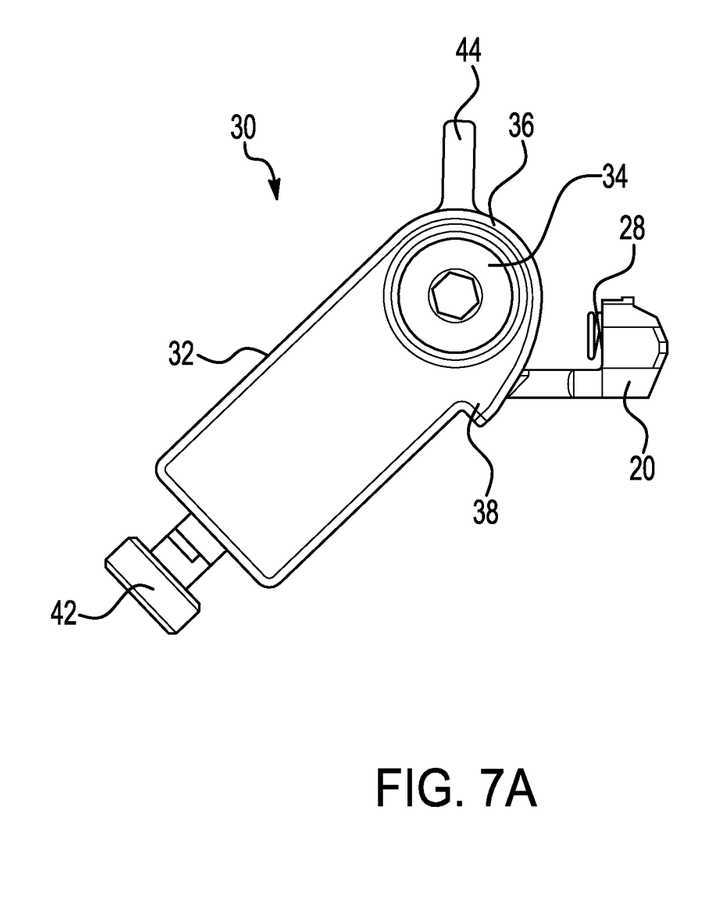
FIG. 7A and FIG. 7B are respective top and bottom views of the lock indicator and actuator components in isolation, which corresponds to the coupling assembly being in a connected state and with the valve open.
Figure 7B:
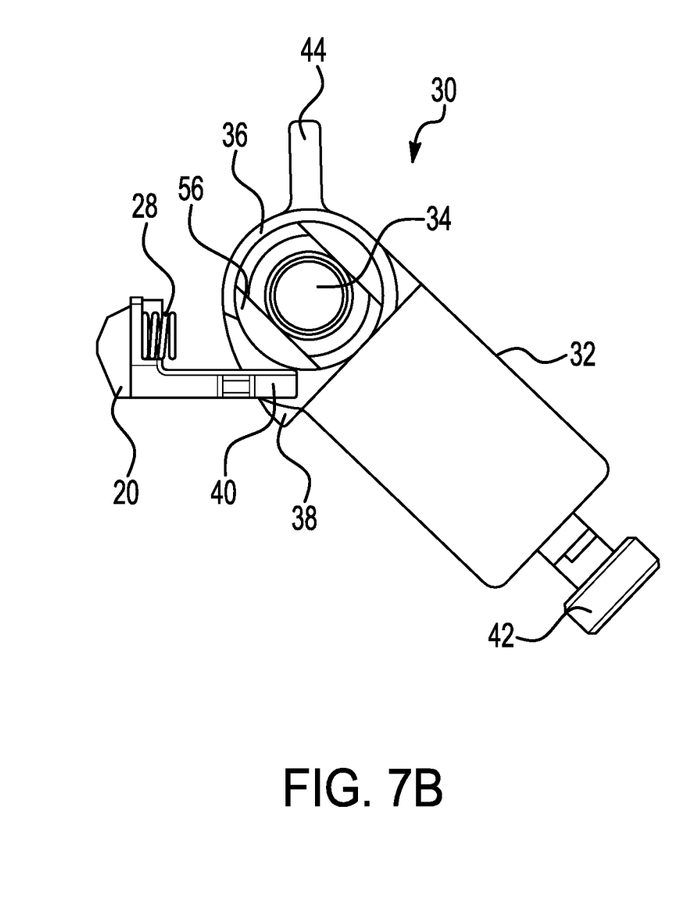
Figure 10:
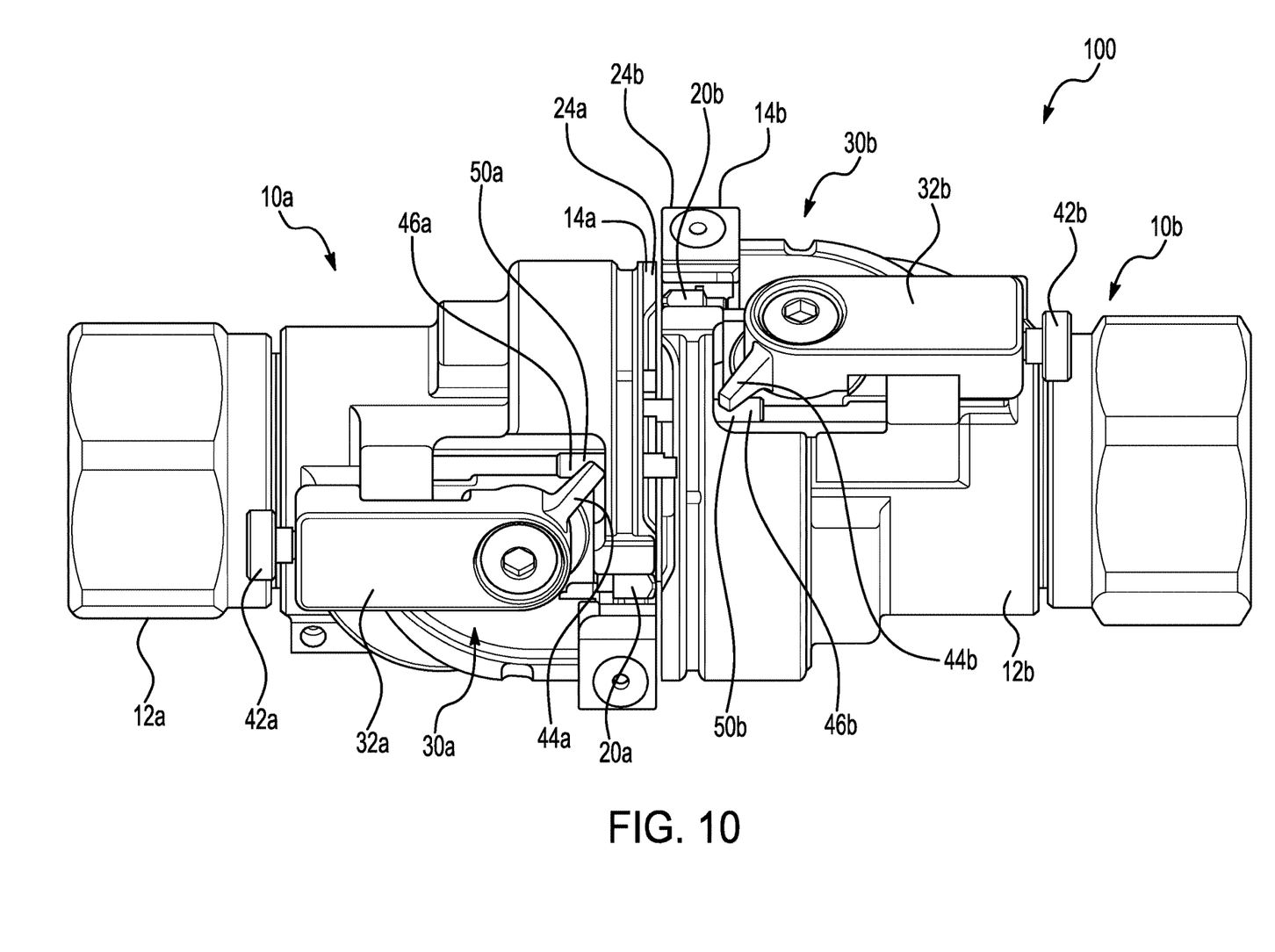
FIG. 10 is a drawing depicting the exemplary unisex coupling connection of FIG. 8, in which the coupling assemblies are in the connected state and with the valves open.

A third state of operation corresponds to the coupling assembly being in a connected state and with the valves open, i.e., a connected/valve open state. FIG. 7A and FIG. 7B are respective top and bottom views of the lock indicator and actuator components in isolation, which corresponds to the coupling assembly being in the connected state and with the valves open to permit fluid flow through the coupling connection. FIG. 10 is a drawing depicting the exemplary unisex coupling connection 100 including the two coupling assembly components 10a and 10b, in which the coupling assemblies 10a and 10b are connected together and with the valves now open. Again, similarly as above as to FIGS. and 9, in FIG. 10 like components are denoted with like reference numerals, except being designated "a" or "b" to denote the corresponding coupling assembly 10a or 10b.

As referenced above, the coupling assemblies previously have been rotated to the connected state, and such rotated configuration is maintained in the third or connected/valve open state. Accordingly, as shown in FIG. 10 each lock indicator 20a/20b is in the second lock indicator position retracted against the bias of their respective springs 28 inward into their respective front faces 24a/24b at the first end 14a/14b toward the second end 16, so as to be essentially encompassed within the coupler body 12.

To reconfigure the coupling assemblies from the connected/valve closed second state to the connected/valve open third state, each actuator 30a/30b is actuated by rotating the actuator handle 32a/32b. To permit such rotation, the pull buttons 42a/42b are pulled to release the actuators 30a/30b to permit rotation. Still referring to FIG. 10, the actuator assemblies 30a and 30b have been rotated to the second actuator positions by rotation of the actuator handles 32a and 32b. In this example, the actuator handles in the second actuator position are aligned with the coupler bodies and the direction of fluid flow through the coupling connection 100. Rotating the actuators 30a/30b from the first actuator position to the second actuator position drives the valves in each of the coupling assemblies to be opened to permit fluid flow through the coupling connection. The rotation of the handles 32a and 32b drives the locking pins 46a and 46b from the retracted position of FIGS. 8 and 9 to an extended position as depicted in FIG. 10. As a result of such rotation to the connected/valve open state, the legs 44a/44b of the actuators 30a/30b interact against the respective pin recesses 50a/50b of the locking pins 46a/46b to drive the locking pins into the extended position. The locking pins 46a and 46b are received in respective locking recesses 58 in the opposing coupler bodies (see the locking recess 58 identified in FIG. 1). In the extended position, therefore, the locking pins operate to lock the two coupling assemblies 10a and 10b in the connected state, which prevents the cooperating and mating coupling assemblies from being rotated and disconnected from each other to maintain the coupling connection 100. Once the actuators have been actuated by rotation of their respective handles, the pull buttons 42a/42b return to their initial position.

As referenced above in connection with FIGS. 6A and 6B, the second or connected/valve closed state results in the shoulder 40 becoming aligned with the groove 56 of the actuator handle 32 (see particularly FIG. 6B), so as to release the stop ridge 38. The actuator handle is then rotated to open the valves to the position of FIGS. 7A and 7B corresponding to the third or connected/valve open state. With rotation of the actuator handle 32, the shoulder 40 slides within the groove 56, as best seen in the bottom view of FIG. 7B, and in the top view of FIG. 7A the shoulder 40 has become obscured from this view by the rotation. In the connected/valve open state as the actuator 30 has been actuated, i.e., the handle 32 has been rotated, the valves are now in the open state to permit fluid flow through the coupling assemblies 10a and 10b of FIG. 10 while the coupling assemblies are connected.

To perform a disconnection operation, the reverse of the above essentially is performed. First, each actuator handle 32 is rotated back to rotate the actuator 30 from the second actuator position to the first actuator position, which also rotates each ball valve 18 from the open position back to the closed position. In addition, the protrusion or leg 44 rotates as well, and thus interacts against the pin recess 50 to drive each locking pin 46 from the extended position back to the retracted position. With the locking pin 46 retracted, a user can relatively rotate the coupling assemblies back relative to each other in the reverse direction as compared to the connection operation, and because the valve 18 is closed, leakage from each coupling assembly is prevented. With the reverse relative rotation, the bias of the lock indicator 20 slides the lock indicator within the open slot in the outer surface of the coupler body 12 back from the second lock indicator position of FIG. 9 to the first lock indicator position of FIG. 8. In such first lock indicator position, the shoulder 40 of the lock indicator is now positioned back against the stop ridge 38 of the actuator handle 32, which prevents rotation of the broader actuator 30. The valve 18, therefore, as referenced above is thereby locked in the closed position while each coupling assembly is in the disconnected state.

Advantages of embodiments of the current application include the following. Embodiments of the current application employ only a single leg on the handle of the actuator to interact with the sliding locking pin. Conventional configurations have employed a plurality of gear teeth that interact with the sliding locking pin, which is a more complex configuration to manufacture and operate. In addition, embodiments of the current application employ a spring-loaded lock indicator with a restriction member feature, such as for example a shoulder protrusion, to prevent or permit rotation of the actuator depending upon the position of the lock indicator. Conventional configurations have employed a second locking pin for control of the handle or comparable actuator mechanism, which is a more complex configuration to manufacture and operate.

An aspect of the invention, therefore, is a fluid coupling assembly having an enhanced actuator and locking mechanism. In exemplary embodiments, the coupling assembly includes a coupler body having a first end and a second end opposite from the first end; a valve that is housed within the coupler body and is moveable between a closed position and an open position; a lock indicator that is movable along an outer surface of the coupler body between a first lock indicator position in which the lock indicator extends from the first end of the coupler body and a second lock indicator position that is retracted toward the second end of the coupler body relative to the first lock indicator position, wherein the lock indicator is biased toward the first lock indicator position and includes a restriction member; an actuator that is movable between a first actuator position and a second actuator position, wherein when the lock indicator is in the first lock indicator position the restriction member maintains the actuator in the first actuator position and precludes movement of the actuator to the second actuator position, and when the lock indicator is in the second lock indicator position the restriction member permits the actuator to move between the first actuator position and the second actuator position; and a locking pin that is moveable between a retracted position in which the locking pin is encompassed by the coupler body and an extended position in which the locking pin extends outward from the coupler body. The actuator moves the valve from the closed position to the open position when the actuator moves from the first actuator position to the second actuator position, and moves the valve from the open position to the closed position when the actuator moves from the second actuator position to the first actuator position; and the actuator includes a leg that drives the locking pin from the retracted position to the extended position when the actuator moves from the first actuator position to the second actuator position, and drives the locking pin from the extended position to the retracted position when the actuator moves from the second actuator position to the first actuator position. The coupling assembly may include one or more of the following features, either individually or in combination.

In an exemplary embodiment of the coupling assembly, the restriction member comprises a shoulder formed in the lock indicator, wherein the shoulder precludes movement of the actuator when the lock indicator is in the first lock indicator position and permits movement of the actuator when the lock indicator is in the second lock indicator position.

In an exemplary embodiment of the coupling assembly, the actuator includes a rotating shaft and a stop ridge that extends from the rotating shaft, and the shoulder of the lock indicator interacts against the stop ridge of the actuator when the lock indicator is in the first lock indicator position to preclude movement of the actuator when the lock indicator is in the first lock indicator position.

In an exemplary embodiment of the coupling assembly, the actuator includes a groove, and the shoulder of the lock indicator is aligned with the groove of the actuator when the lock indicator is in the second lock indicator position such that the shoulder can slide within the grove to permit movement of the actuator between the first actuator position and the second actuator position when the lock indicator is in the second lock indicator position.

In an exemplary embodiment of the coupling assembly, the leg extends from the rotating shaft and the locking pin includes a base that defines a pin recess that receives the leg, wherein the leg interacts against the pin recess to drive the locking pin between the retracted position and the extended position.

In an exemplary embodiment of the coupling assembly, the locking pin includes a locking end that extends from the coupler body when the locking pin is in the extended position.

In an exemplary embodiment of the coupling assembly, the actuator includes a handle that is operable by a user to rotate the actuator between the first actuator position and the second actuator position.

In an exemplary embodiment of the coupling assembly, the actuator further includes a pull knob that is pulled to permit movement of the actuator between the first actuator position and the second actuator position.

In an exemplary embodiment of the coupling assembly, the actuator defines a bore that receives a fastening element, and the fastening element connects the valve to the actuator.

In an exemplary embodiment of the coupling assembly, the valve is a ball valve that rotates between the closed position and the open position.

In an exemplary embodiment of the coupling assembly, the first end of the coupler body comprises a coupling face that defines an open slot, and the lock indicator slides within the open slot between the first lock indicator position and the second lock indicator position.

In an exemplary embodiment of the coupling assembly, the coupling face further defines a recess that receives an opposing lock indicator of a second coupling assembly during a connection operation, and during the connection operation the coupling assembly and the second coupling assembly are rotated relative to each other, and the recess has a surface the drives the opposing lock indicator from the first lock indicator position to the second lock indicator position during the connection operation.

In an exemplary embodiment of the coupling assembly, the coupling face further defines a locking recess that receives an opposing locking pin of the second coupling assembly during the connection operation when the opposing locking pin is in the extended position.

In an exemplary embodiment of the coupling assembly, the coupling assembly is reconfigurable among three states including: a disconnected state in which the lock indicator is in the first lock indicator position, thereby maintaining the actuator in the first actuator position such that the valve is in the closed position and the locking pin is in the retracted position; a connected/valve closed state in which the lock indicator is in the second lock indicator position to permit movement of the actuator, with the actuator still being in the first actuator position such that the valve is in the closed position and the locking pin is in the retracted position; and a connected/valve open state in which the lock indicator is in the second lock indicator position to permit movement of the actuator, with the actuator being in the second actuator position such that the valve is in the open position and the locking pin is in the extended position.

In an exemplary embodiment of the coupling assembly, the coupling assembly further includes a biasing member that biases the lock indicator toward the first lock indicator position.

In an exemplary embodiment of the coupling assembly, the biasing member comprises a spring Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling assembly comprising:
a coupler body having a first end and a second end opposite from the first end;
a valve that is housed within the coupler body and is moveable between a closed position and an open position;
a lock indicator that is movable along an outer surface of the coupler body between a first lock indicator position in which the lock indicator extends from the first end of the coupler body and a second lock indicator position that is retracted toward the second end of the coupler body relative to the first lock indicator position, wherein the lock indicator is biased toward the first lock indicator position and includes a restriction member;
an actuator that is movable between a first actuator position and a second actuator position, wherein when the lock indicator is in the first lock indicator position the restriction member maintains the actuator in the first actuator position and precludes movement of the actuator to the second actuator position, and when the lock indicator is in the second lock indicator position the restriction member permits the actuator to move between the first actuator position and the second actuator position; and
a locking pin that is moveable between a retracted position in which the locking pin is encompassed by the coupler body and an extended position in which the locking pin extends outward from the coupler body;
wherein the actuator moves the valve from the closed position to the open position when the actuator moves from the first actuator position to the second actuator position, and moves the valve from the open position to the closed position when the actuator moves from the second actuator position to the first actuator position; and
the actuator includes a leg that drives the locking pin from the retracted position to the extended position when the actuator moves from the first actuator position to the second actuator position, and drives the locking pin from the extended position to the retracted position when the actuator moves from the second actuator position to the first actuator position.

2. The coupling assembly of claim 1, wherein the restriction member comprises a shoulder formed on the lock indicator, wherein the shoulder precludes movement of the actuator when the lock indicator is in the first lock indicator position and permits movement of the actuator when the lock indicator is in the second lock indicator position.

3. The coupling assembly of claim 2, wherein the actuator includes a rotating shaft and a stop ridge that extends from the rotating shaft, and the shoulder of the lock indicator interacts against the stop ridge of the actuator when the lock indicator is in the first lock indicator position to preclude movement of the actuator when the lock indicator is in the first lock indicator position.

4. The coupling assembly of claim 3, wherein the actuator includes a groove, and the shoulder of the lock indicator is aligned with the groove of the actuator when the lock indicator is in the second lock indicator position such that the shoulder can slide within the grove to permit movement of the actuator between the first actuator position and the second actuator position when the lock indicator is in the second lock indicator position.

5. The coupling assembly of claim 3, wherein the leg extends from the rotating shaft and the locking pin includes a base that defines a pin recess that receives the leg, wherein the leg interacts against the pin recess to drive the locking pin between the retracted position and the extended position.

6. The coupling assembly of claim 1, wherein the locking pin includes a locking end that extends from the coupler body when the locking pin is in the extended position.

7. The coupling assembly of claim 1, wherein the actuator includes a handle that is operable by a user to rotate the actuator between the first actuator position and the second actuator position.

8. The coupler assembly of claim 1, wherein the actuator further includes a pull knob that is pulled to permit movement of the actuator between the first actuator position and the second actuator position.

9. The coupling assembly of claim 1, wherein the actuator defines a bore that receives a fastening element, and the fastening element connects the valve to the actuator.

10. The coupling assembly of claim 1, wherein the valve is a ball valve that rotates between the closed position and the open position.

11. The coupling assembly of claim 1, wherein the first end of the coupler body comprises a coupling face that defines an open slot, and the lock indicator slides within the open slot between the first lock indicator position and the second lock indicator position.

12. The coupling assembly of claim 11, wherein the coupling face further defines a recess that receives an opposing lock indicator of a second coupling assembly during a connection operation, and during the connection operation the coupling assembly and the second coupling assembly are rotated relative to each other, and the recess has a surface that drives the opposing lock indicator from the first lock indicator position to the second lock indicator position during the connection operation.

13. The coupling assembly of claim 11, wherein the coupling face further defines a locking recess that receives an opposing locking pin of the second coupling assembly during the connection operation when the opposing locking pin is in the extended position.

14. The coupling assembly of claim 1, wherein the coupling assembly is reconfigurable among three states including:
a disconnected state in which the lock indicator is in the first lock indicator position, thereby maintaining the actuator in the first actuator position such that the valve is in the closed position and the locking pin is in the retracted position;
a connected/valve closed state in which the lock indicator is in the second lock indicator position to permit movement of the actuator, with the actuator still being in the first actuator position such that the valve is in the closed position and the locking pin is in the retracted position; and
a connected/valve open state in which the lock indicator is in the second lock indicator position to permit movement of the actuator, with the actuator being in the second actuator position such that the valve is in the open position and the locking pin is in the extended position.

15. The coupling assembly of claim 1, further comprising a biasing member that biases the lock indicator toward the first lock indicator position.

16. The coupling assembly of claim 15, wherein the biasing member comprises a spring.

* * * * *